Patented Sept. 15, 1942

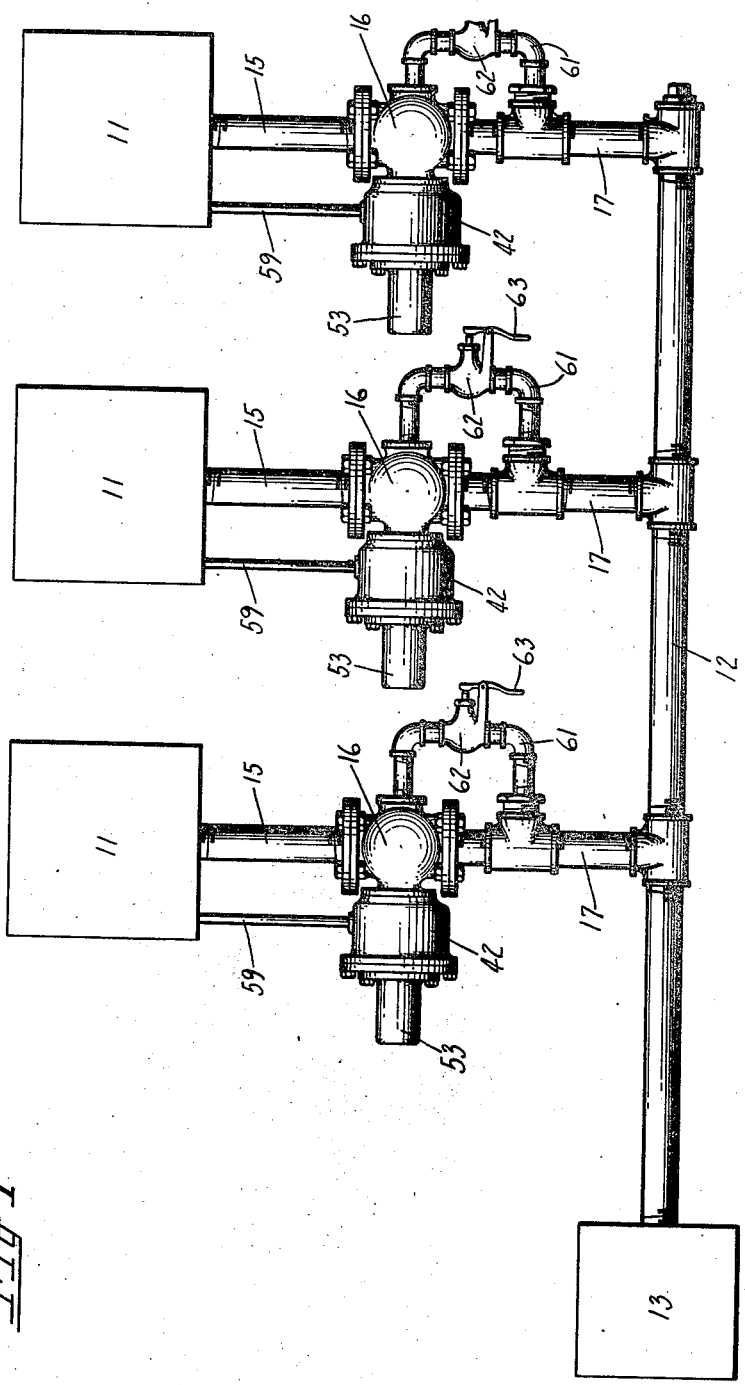

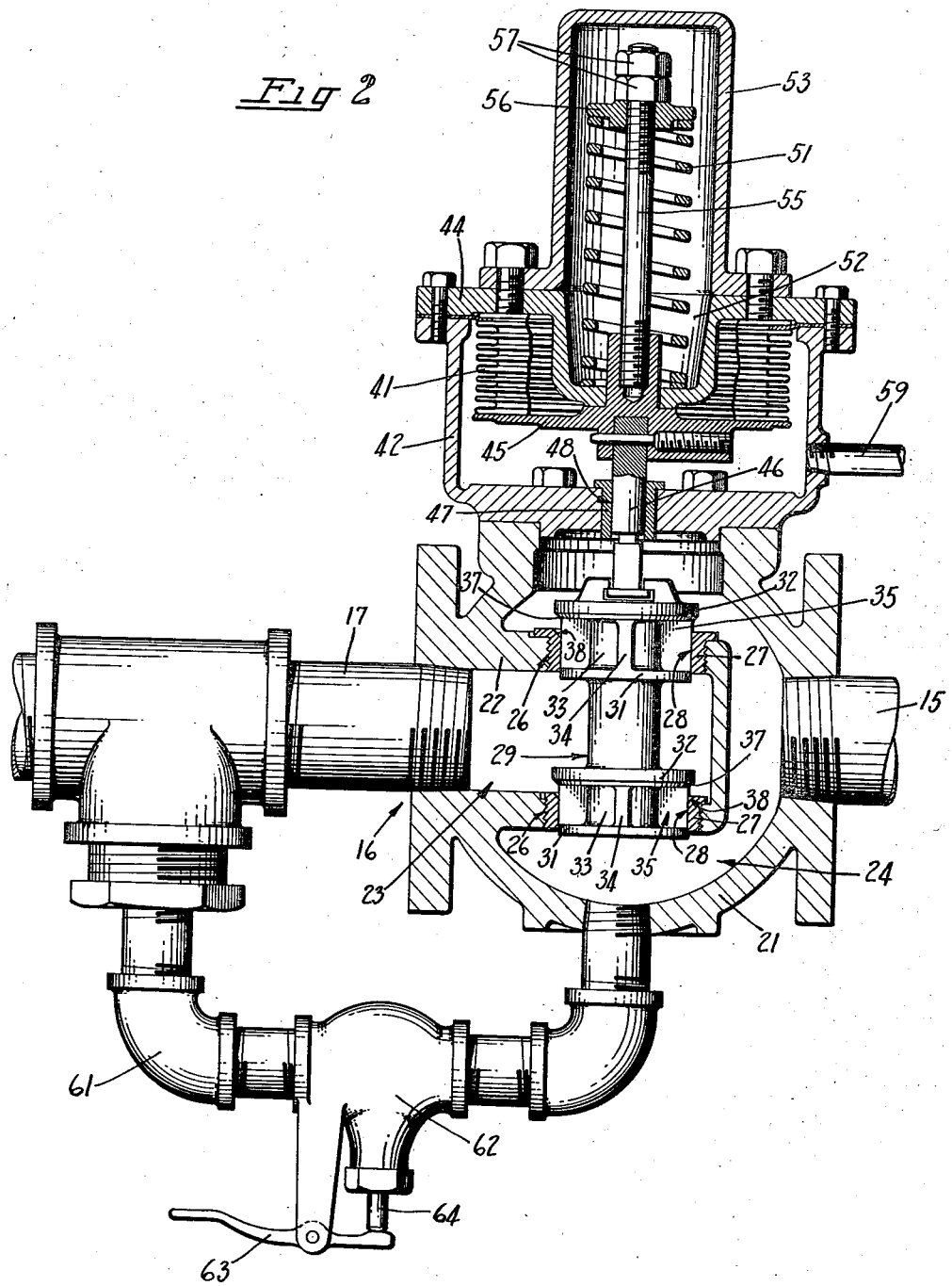

2,295,611

UNITED STATES PATENT OFFICE 2,295,611

VACUUM SYSTEM FOR CAN CLOSING MACHINES

William R. Smith, Portland, Oreg., assignor to American Can Company, New York, N. Y., a corporation of New Jersey Application June 7, 1939, Serial No. 277,919

4 Claims. (Cl. 137—78)

The present invention relates to regulating the vacuum supply for a plurality or battery of vacuum can closing machines or the like and has particular reference to maintaining normal vacuum conditions in all normal operating unit machines when abnormal conditions obtain in one or more of the machines in the line.

For economical reasons in developing vacuum conditions in a plurality of machines, such as can closing machines or the like, it has been found desirable to arrange such machines in a battery and connect them into a single vacuum line leading to a single source of vacuum, such as a vacuum pump by means of which air is withdrawn from the line and from the machines. In such a hook-up, however, considerable difficulty has been experienced in maintaining a predetermined degree of vacuum in the line when abnormal vacuum conditions obtain in one or more of the machines so interconnected.

For example, when the vacuum chamber of one of the machines in the battery is accidentally opened to the atmosphere as by a can jamming in the entrance or discharge ports of the chamber, the vacuum condition in this one machine is so rapidly dissipated that it over-taxes the capacity of the vacuum pump and thereby nullifies the vacuum in the line and in the other machines connected therewith. Machines of this character are usually equipped with low vacuum stop devices so that the machines in the battery line automatically cease operation when such abnormal conditions exist initially even in only one of them.

The instant invention contemplates overcoming these difficulties by utilizing an improved automatically operable valve in the vacuum pipe leading from each machine so that when abnormal conditions occur in any one machine in the battery the valve of this particular machine will operate to immediately and automatically cut off this abnormal machine from the vacuum line. The other machines thereupon function normally, the usual vacuum conditions existing in the line and in the machines.

An object therefore of the invention is the provision of means for regulating vacuum line pressure in an individual machine of a series of machines connected into the vacuum line, so that one machine may be opened to atmosphere without affecting the normal absolute pressure on the vacuum line or on the other machines.

Another object is the provision of such means wherein normal vacuum conditions may be reestablished in one or more of the machines in the series without affecting the absolute pressure on the vacuum line or on the other machines.

Numerous other objects and advantages of the invention will be apparent as it is better understood from the following description, which, taken in connection with the accompanying drawings, discloses a preferred embodiment thereof.

Referring to the drawings:

Figure 1 is a schematic plan view of an apparatus for carrying out the instant invention; and Fig. 2 is an enlarged detail of one unit of the apparatus with parts of the view shown in section and other parts shown in elevation.

As a preferred embodiment of the instant invention, the drawings illustrate one form of apparatus for maintaining normal vacuum conditions in vacuum chambers of a plurality of vacuum can closing machines 11 (Fig. 1) which are served by a vacuum pipe line 12 from which air may be exhausted by a vacuum pump 13 in accordance with the steps of the method. Each machine 11 is connected by a vacuum pipe 15 into one side of an automatically operable valve 16 the opposite side of which is connected by a pipe 17 into the vacuum line 12.

Each valve 16 (Fig. 2) includes a hollow valve housing 21 into opposite ends of which the vacuum pipes 15, 17 are threaded. Adjacent the inner end of pipe 17 the valve housing is formed with a seat cage 22 which divides the interior of the housing into two compartments, an inner compartment 23 and an outer compartment 24. The pipe 15 communicates with the outer compartment 24, while pipe 17 communicates with the inner compartment 23.

The seat cage 22 is provided with two aligned upper and lower openings 26 in which are disposed hardened cylindrical valve seat bushings 27 having aligned valve bores 28 in which a valve unit 29 is located. The valve unit is adapted to slide in the bores to open or close communication between the compartments 23, 24 and thus permit or prevent the passage of air from pipe 15 into pipe 17. For this purpose the valve unit is provided at each end thereof with a pair of lower valve discs 31 and a pair of upper valve discs 32, the lower and upper discs at each end of the unit being spaced apart and connected by a spider 33 having vertical webs 34 and intervening spaces 35.

In one position (Fig. 2) of the valve unit 29 the lower valve discs are adapted to seat snugly within the lower ends of the valve bores 28 thereby closing both bores and cutting off communication between the compartments 23, 24. In the other position of the valve unit the upper discs 32 are adapted to seat tightly against the top of the valve seat bushings 27, there being bevels 37 on the discs and cooperating bevels 38 on the bushings for this purpose. When the valve unit is in this latter position communication between the compartments 23, 24 is also cut off. Communication between the compartments is only established when the valve unit is in a midway position with neither upper or lower valve discs in engagement with the seat bushing.

Shifting of the valve unit 29 in its valve seat bushings 27 is effected by a Sylphon or bellows 41 which is disposed in a casing 42 bolted to the top of the valve housing 21. The Sylphon is interposed between a casing cover plate 44 secured to the top of the casing, and a plate 45 which is located inside the casing. The plate is connected by a stem 46 to the upper end of the valve unit 29. For this purpose the stem extends down through a bushing 47 located in a hole 48 formed in the bottom of the casing.

The plate 45 is also sometimes maintained in raised position under pressure of a compression spring 51 which is disposed in a pocket 52 of the casing cover 44 and which projects up into an elongated cap 53 bolted to the top of the casing cover. The spring surrounds a vertical rod 55, the lower end of which is threaded into the Sylphon plate 45. The upper end of the rod carries a washer 56 and a pair of lock nuts 57 for holding the spring in place and for adjusting the compression of the spring on the plate 45.

The interior of the Sylphon casing 42, this being outside of the Sylphon bellows, is connected by a small diameter pipe 59 to the vacuum chamber of the machine 11 (see also Fig. 1). Hence the vacuum condition existing in the vacuum chamber of a particular machine also obtains within the Sylphon casing connected with it and thereby reacts on the Sylphon located therein.

When the vacuum condition in the chamber of a machine is normal, i. e., at a desired predetermined degree for normal operation of the machine, the Sylphon 41 holds the plate 45 down, this being against the resistance of the spring 51. In this Sylphon holding position the valve unit 29 is midway relative to its valve seats, as hereinbefore described. In this midway position of the valve parts, air in the machine vacuum chamber is drawn out through pipe 15, valve compartment 24, and flows through the spider spaces 35, through the upper and lower seat bushings 27, into the inner compartment 23, and thus through the pipe 17 into the main vacuum line 12. It is exhausted by the vacuum pump 13.

When the absolute pressure drops and the degree of vacuum in the machine chamber rises to a point higher than the desired amount, the Sylphon 41 expands and thus presses the plate 45 still further in a downward direction and this pushes the valve unit 29 further down within the bores 28. This brings the upper valve discs 32 down closer to the valve seats 38 in the valve bushings 27 and thus restricts the openings through which the air is withdrawn. This partly cuts off connection with the source of vacuum. If the pressure within the machine chamber continues to fall, the Sylphon reacts to entirely close off the valve and thus completely cut off the vacuum pull from the vacuum line. Such a blocked condition obtains until such time as the pressure in the machine chamber rises far enough to again require readjustment.

On the other hand when the pressure in the machine chamber rises above the desired degree of vacuum, the Sylphon contracts and draws the valve unit 29 up within its seat bores 28 so that the upper discs 32 will move further away from the valve seats 38 and thus create a larger opening therearound so that air from the chamber may be more rapidly drawn into the vacuum line 12. Such an action on an enlarged scale takes place when the vacuum chamber of the machine is accidentally or otherwise opened to the atmosphere as will now be explained.

Under such conditions, as when the machine chamber is opened to the atmosphere, the vacuum therein is immediately dissipated and this condition is transmitted through pipe 59 to the Sylphon. The Sylphon thereupon suddenly contracts. In the ordinary vacuum installation the valve is immediately opened wide so that the full effect of the vacuum line is manifest. The result is that the vacuum pump is over-taxed to such an extent that vacuum is not drawn on the other machines. Hence they cease operation through their low vacuum cutouts.

However, when these conditions prevail in machines embodying the present invention, the contracting Sylphon immediately draws the valve unit lower discs 31 up into the valve bores 28 and thereby instantly closes the valve instead of opening it wider. Thus communication between pipe 15 and pipe 17 is cut off as to this machine unit and the increased pressure in this one machine is thereby prevented from affecting the absolute pressure on the vacuum line or on the other machines in the battery. The other machines continue to operate under normal vacuum conditions created by the vacuum pipe line 12.

After such a cut out machine is repaired and it is to be returned to normal operating conditions, provision is made for reestablishing the proper vacuum conditions within the machine vacuum chamber without affecting the absolute pressure in the other machines. This is effected by way of a by-pass pipe line 61 which connects the pipe 17 with the outer compartment 24 of the valve 16. This by-pass line includes a small manually operable whistle valve 62 which may be opened by way of a lever 63 operating against a spring held valve stem 64.

When the whistle valve 62 is held open, communication is established between the pipe 17, the outer compartment 24 of the valve and the pipe 15 and the air within the machine chamber is thus by-passed and gradually exhausted without affecting the pressure on the vacuum line or on the other machines in the series. As the absolute pressure in the machine chamber returns to its normal degree of vacuum it becomes effective upon the Sylphon 41. The Sylphon thereupon resumes control of the valve unit 29 and thus opens the valve 16 so that the chamber air may be exhausted directly through the valve bores 28 and valve unit 29. The whistle valve 62 may thereupon be released or closed.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for regulating vacuum conditions in a plurality of can closing machines connected to a common vacuum source wherein the closing chambers of the respective machines may be subjected to undesired excessively high vacuum or inadvertently opened to atmosphere and wherein any machine may be disconnected from the vacuum source, the combination of valve means disposed in the connection between one of said machines and the vacuum source, said valve being movable in opposite directions to shut off communication between said machine and said source and to an intermediate position to establish communication therebetween, a closed casing communicably connected with the can closing chamber of said machine so as to be subject to pressure conditions therein, and means in said casing connected to said valve means for actuating the latter in response to existing pressure conditions within said casing, said actuating means being moved in one direction to close said valve and shut off said machine from the vacuum source when the degree of vacuum in said closing chamber exceeds a predetermined limit and in the opposite direction to close said valve when said closing chamber is inadvertently opened to atmosphere, whereby to insure against imposing undue strain on said vacuum source.

2. In an apparatus for regulating vacuum conditions in a plurality of can closing machines connected to a common vacuum source wherein the closing chambers of the respective machines may be subjected to undesired excessively high vacuum or inadvertently opened to atmosphere and wherein any machine may be disconnected from the vacuum source, the combination of valve means disposed in the connection between one of said machines and the vacuum source, said valve being movable in opposite directions to shut off communication between said machine and said source and to an intermediate position to establish communication therebetween, a closed casing having a conduit communicably connected with the can closing chamber of said machine so as to be subject to pressure conditions therein, and a Sylphon bellows member in said casing connected to said valve means for actuating the latter in response to existing pressure conditions within said casing, said Sylphon member being moved in one direction to close said valve and shut off said machine from the vacuum source when the degree of vacuum in said closing chamber exceeds a predetermined limit and in the opposite direction to close said valve when said closing chamber is inadvertently opened to atmosphere, whereby to insure against imposing undue strain on said vacuum source.

3. In an apparatus for regulating vacuum conditions in a plurality of can closing machines connected to a common vacuum source wherein the closing chambers of the respective machines may be subjected to undesired excessively high vacuum or inadvertently opened to atmosphere and wherein any machine may be disconnected from the vacuum source, the combination of valve means disposed in the connection between one of said machines and the vacuum source, said valve being movable in opposite directions to shut off communication between said machine and said source and to an intermediate position to establish communication therebetween, a closed casing communicably connected with the can closing chamber of said machine so as to be subject to pressure conditions therein, means in said casing connected to said valve means for actuating the latter in response to existing pressure conditions within said casing, said actuating means being moved in one direction to close said valve and shut off said machine from the vacuum source when the degree of vacuum in said closing chamber exceeds a predetermined limit, and in the opposite direction to close said valve when said closing chamber is inadvertently opened to atmosphere, whereby to maintain normal desired operating conditions in the remaining machines without imposing undue strain on said vacuum source, and means for re-establishing communication between said vacuum source and the shut off machine to the end that normal vacuum conditions may be again gradually established therein by movement of said valve to intermediate position without materially affecting the absolute pressure in the vacuum line.

4. In an apparatus for regulating vacuum conditions in a plurality of can closing machines connected to a common vacuum source wherein the closing chambers of the respective machines may be subjected to undesired excessively high vacuum or inadvertently opened to atmosphere and wherein any machine may be disconnected from the vacuum source, the combination of valve means disposed in the connection between one of said machines and the vacuum source, said valve being movable in opposite directions to shut off communication between said machine and said source and to an intermediate position to establish communication therebetween, a closed casing having a conduit communicably connected with the can closing chamber of said machine so as to be subject to pressure conditions therein, a Sylphon bellows element in said casing connected to said valve means for actuating the latter in response to existing pressure conditions within said casing, said element being moved in one direction to close said valve and shut off said machine from the vacuum source when the degree of vacuum in said closing chamber exceeds a predetermined limit, and in the opposite direction to close said valve when said closing chamber is inadvertently opened to atmosphere, whereby to maintain normal desired operating conditions in the remaining machines without imposing undue strain on said vacuum source, and a valve controlled by-pass conduit between said machine and said vacuum source for re-establishing communication between said vacuum source and the machine so shut off to the end that normal vacuum conditions may be again gradually established therein by movement of said valve means to normal intermediate position without materially affecting the absolute pressure in the vacuum line.

WILLIAM R. SMITH.